ROLL CALL GENERATOR

Filed Oct. 23, 1961

INVENTORS.
FREDDY DAVID
WILLIAM V. TYRLICK
BY
George W. Killion
AGENT 3,223,977

ROLL CALL GENERATOR

Freddy David, Rochester, N.Y., and William V. Tyrlick, Teaneck, N.J., assignors, by mesne assignments, to Stromberg-Carlson Corporation, Rochester, N.Y., a corporation of Delaware Filed Oct. 23, 1961, Ser. No. 146,991
3 Claims. (Cl. 340—147)

This invention relates in general to data transmission systems and, more particularly, to a roll call generator for interrogating individual transmitting stations with said system.

Although the invention herein disclosed is suitable for more general application, it is particularly adapted for use in teletypewriter data transmission systems. In such systems it is conventional to provide a central office having connected thereto a plurality of lines with one or more stations on each line. Data transmission may take place from the station to the office, or from the office to one or more selected stations on the line. In addition, it is conventional to arrange the equipment to permit simultaneous transmission of data from the office to one or more selected stations on the line and for the transmission of data from another station on the line to the central office. That is, a given line may be transmitting and receiving information simultaneously.

In the usual case, the volume of traffic outgoing from an office is greater than the traffic incoming to the office. Accordingly, it is customary to arrange the equipment in a manner to give priority to outgoing traffic. In order to assure that no outgoing messages are lost due to inoperative, or faulty, equipment at the receiving station, the equipment is arranged to inhibit the transmission of an outgoing message until an acknowledgment signal is received from the terminating station indicating it is capable of recording the incoming message. But, in order to receive an acknowledgment signal, it may be necessary to momentarily interrupt an incoming transmission and, therefore, the equipment is designed to permit the momentary interruption of an incoming message in order to facilitate the initiation of the transmission of an outgoing message. The inverse is not true; that is, an outgoing message is not interrupted to permit the initiation of the transmission of an incoming message. Furthermore, the individual stations are not arranged to initiate a transmission to the central office, but, rather, transmit only in response to an interrogating signal from the central office.

Therefore, in order to interrogate the various stations connected to the central office, the central office is equipped with what is customarily termed "roll call" equipment, which sequentially interrogates each station. It is known to use electromechanical roll call equipment. However, electromechanical roll call equipment tends to be bulky and slow in operation and requires constant vigilance and adjustment to maintain in satisfactory operating condition.

Accordingly, it is a general object of this invention to provide a new and improved roll call generator.

It is a more particular object of this invention to provide a new and improved roll call generator employing time division multiplex control signals.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise two sheets of figures which should be arranged in successive order from left to right to show the invention.

It is to be understood that the drawings show only a logic diagram rather than the intricate circuit details which would only tend to mask or obscure the inventive features disclosed herein. However, as an aid in understanding the logic of the invention, different symbols have been adopted for each different type of circuit, and prefix letters have been added to the numerical designations in order to indicate the nature of the circuit. For example, the letters FF have been added to indicate flip-flop circuits; the letters OR to indicate OR gates; the letters INV to indicate inverters; DL to indicate delay lines; and A for AND gates. Typical circuits for various types of gates, inverters, and flip-flops, etc., are shown and described in Patent No. 2,933,564, issued April 19, 1960, to James G. Pearce, et al. For convenience in analyzing the logic diagram, the reset side of the flip-flops is shaded and the inputs to the flip-flops are indicated by arrows. Where flip-flops are used to enable AND gates, the gates are only enabled when the flip-flop is in the set condition.

In addition to the above described circuits, various other circuits are used. The address store 5 may comprise a standard magnetic drum having a plurality of tracks 11–16 in which signals may be stored. In the disclosed embodiment, tracks 11–14 are control tracks, and the remaining tracks are informational tracks. The address store is used to provide a permanent registration of signals indicative of the address of each station on each line connected to the office and which it is desired to be able to roll call. By address, of course, is meant a record of the route which must be taken and the signals which must be transmitted in order to interrogate, or roll call, a particular station. The addresses are recorded in groups wherein each group includes the addresses of all stations on a particular line. The start of each group is indicated by a recording in track 14. Thus, there will be as many recorded signals in track 14 as the number of lines having stations to be roll called. Track 11 has a single recording which serves to define a "home" or initial position of the magnetic drum. Track 12 is a clock pulse track and has a recorded signal in each cell. Track 13 is employed, in a manner to be more fully described below, to assist in the location of the cells having recorded therein the address of a preselected station on a particular line. In the specific embodiment of the invention, disclosed herein, it is necessary to erase, record, and read out signals in track 13 and, therefore, the leads 13ER and 13REC are provided to introduce erasing and recording signals, respectively, to track 13, and lead 13RO is provided to read out signals recorded in track 13. Accordingly, with the magnetic drum address store described, it will be possible to locate the address of a preselected station on a particular line by first detecting the fiducial pulse in track 11, then counting the signals in track 14 until the group of addresses including the desired preselected address is located and, finally, enabling the associated equipment to respond to a single signal in track 13 to locate the address of the preselected station.

Line number counter 1 is a ring counter with as many steps in the ring as the number of lines connected to the central office and which, of course, is also equal to the number of groups of recordings in the address store 5. Therefore, if the line number counter 1 is set a particular number of steps before its home position and is enabled to step one step in response to the detection of each signal in track 14 after the detection of a fiducial pulse, the line number counter 1 will be in its home position at the time that the desired particular group of addresses is set to pass under the reading heads. The line number counter 1 is arranged to produce an output pulse each time it counts around the ring to its home position.

The time position generator counter 2 is used to set the line number counter 1 to the desired position in the manner to be more fully described below.

The station number counter 3 is somewhat similar in function to line number counter 1 in that it too includes a counter. The capacity of the station number counter is at least as great as the maximum number of stations in any one group. This counter is not preset and is not ring-connected. It should be observed that two inputs are provided for station number counter 3, one of which counts the counter up while the other input counts the counter down. The station number counter is arranged to produce an output pulse when it is at +1 from its home position. The reason for this and the use of the output pulse will be described more fully below.

The route indicator store temporarily stores the information read from the informational tracts 15 and 16 and transmits the signals stored therein in the appropriate time slot of the time division multiplex system.

Signals transmitted from individual stations to the central office are received through incoming line units 6, while signals transmitted from the central office to the lines are sent out through outgoing line units 7.

*Detailed description*

Figure 1:
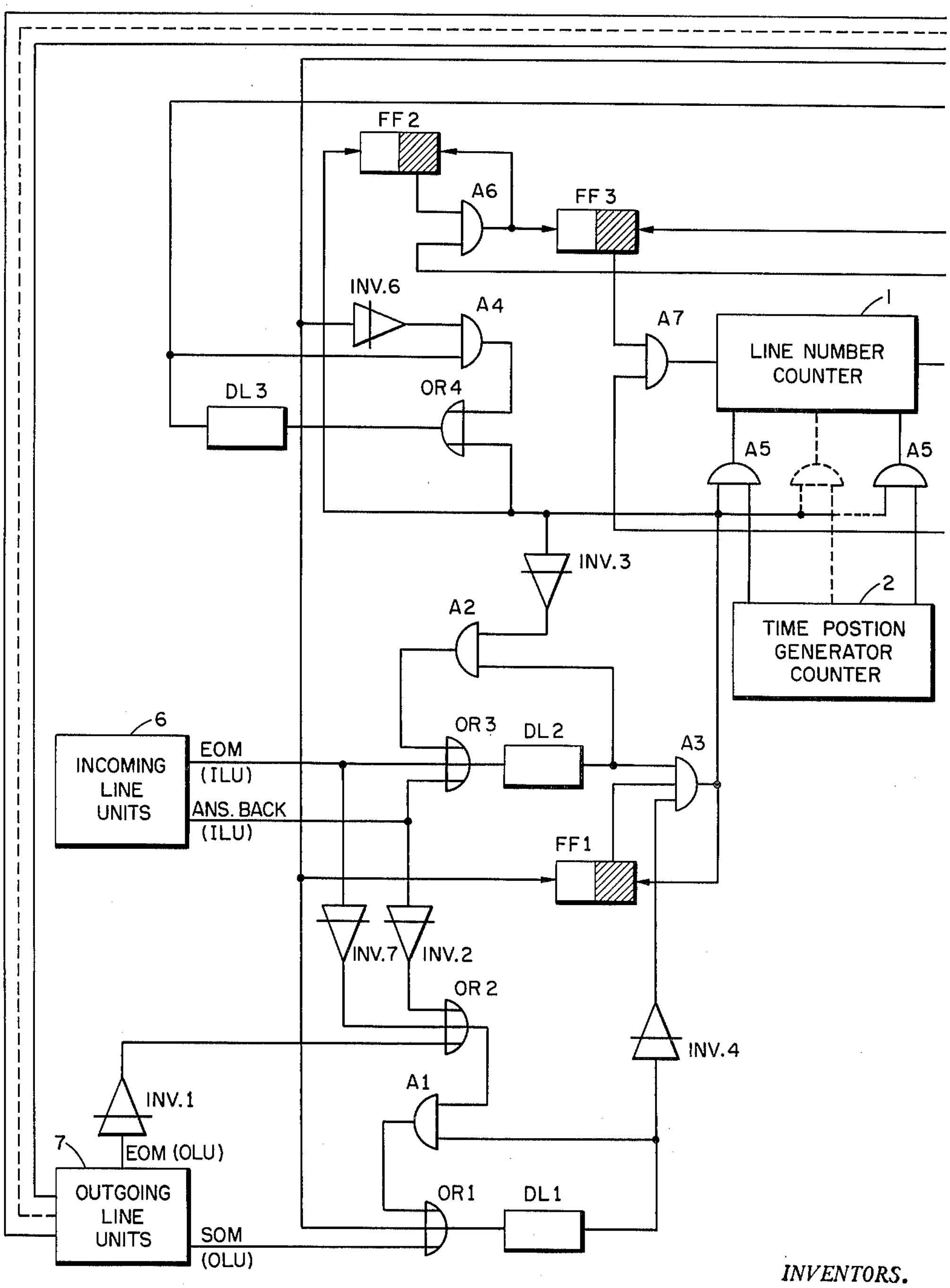
Figure 2:
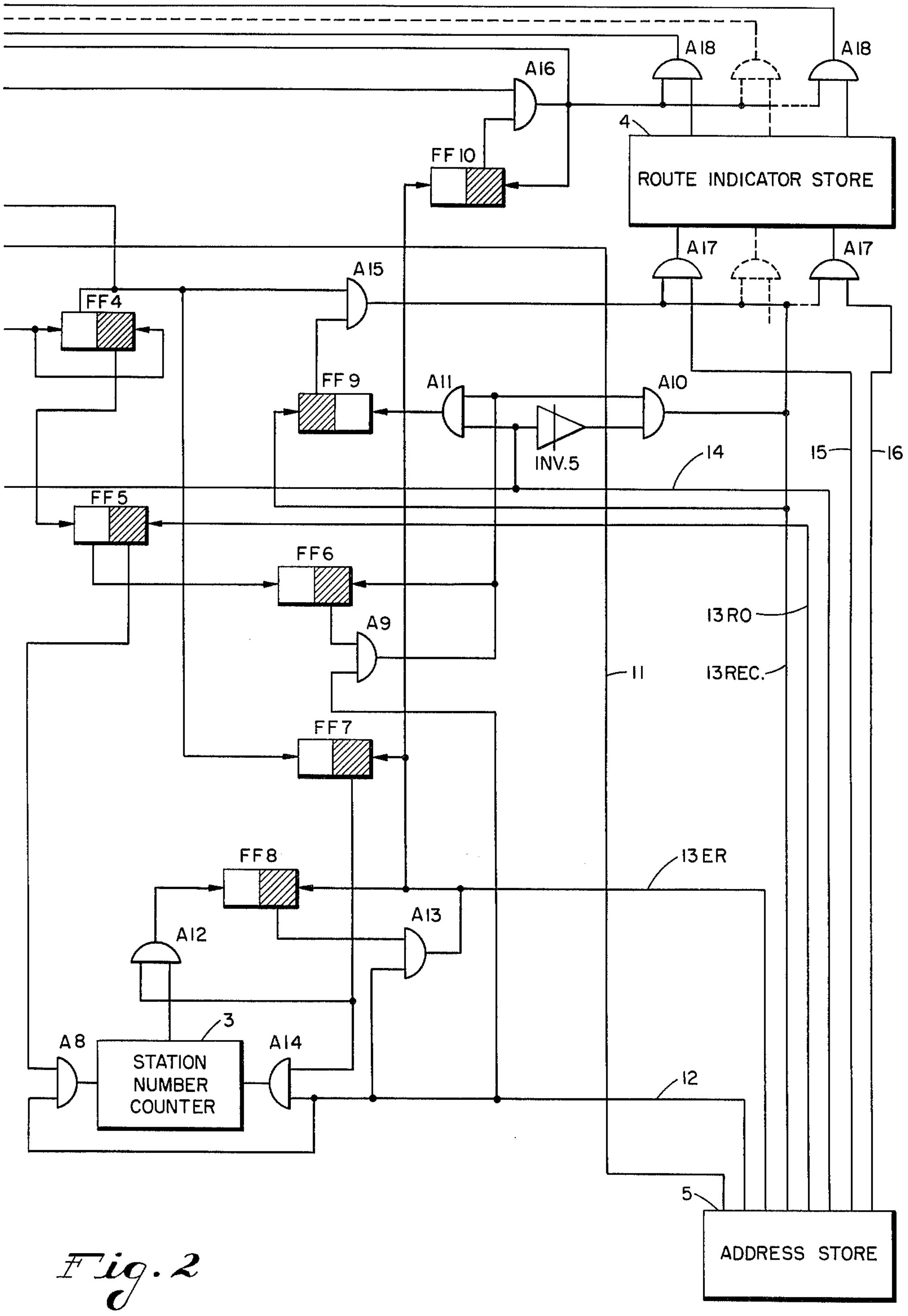

The present invention employs well known and widely used time division multiplex principles. Each time frame in the system includes at least as many time slots as the number of lines connected to the central office and each line is permanently associated with a particular time slot.

As previously mentioned, the individual stations transmit messages to the central office only in response to a roll call operation. After being roll called, a station which has no message to transmit returns an answer back signal, which passes through the associated incoming line unit 6 and, by means of the time division multiplex equipment, forwards a pulse in the time position of the associated line through OR gate OR3 to delay line DL2. The pulse enters delay line DL2 and is recirculated after passing through AND gate A2 and OR gate OR3 as long as gate A2 is enabled. Gate A2 is enabled by inverter INV3 until an output pulse appears at gate A3. Thus, it will be seen that when a pulse is gated out of delay line DL2, that the recirculation of that pulse in delay line DL2 will be inhibited by the closing of gate A2. Thus, an interrogated station which has no message to transmit causes a time position signal to be stored in delay line DL2 to indicate that no message is being transmitted from a station on that line to the central office and that, therefore, the line is available to be roll called. It will be seen later that the roll calling of a particular line will be inhibited when an outgoing message is being transmitted over that particular line. Thus, delay line DL2 may be considered to be the memory of lines which may roll called if the roll call is not inhibited for some other reason.

In a similar manner, when a station concludes the transmission of a message to the central office, an end of message signal is transmitted to the EOM(ILU) lead in the appropriate time position to record a pulse in delay line DL2 so that another roll call may be initiated on that line.

As already mentioned, an outgoing message is not interrupted to initiate receipt of an incoming message; therefore, any line having a message being transmitted thereto must not be able to initiate a roll call. At the start of an outgoing message, a pulse is generated in the associated outgoing line unit 7, which is forwarded in the appropriate time position over lead SOM(OLU) to delay line DL1. The output potential of gate OR2 normally holds gate A1 enabled and, therefore, any pulses circulated in delay line DL1 are recirculated in the same time position. Thus, delay line DL1 includes a memory of lines not to be roll called because a message is being transmitted thereto. At the end of each message, the outgoing line unit places a pulse on the EOM(OLU) lead which causes a pulse to be transmitted through inverter INV1 and gate OR2 to inhibit the recirculation of the pulse in the time position of the line which had been transmitting. In a similar manner, at the end of the message on an incoming line unit, a pulse is forwarded on the EOM(ILU) lead to inhibit the recirculation of a pulse in the delay line DL1 in the time position of the line which had been transmitting.

It should be observed that a pulse on the ANS BACK(ILU) lead will stop the recirculation of a pulse in delay line DL1 in the same manner that a pulse on the EOM(OLU) did. During the transmission of the data to interrogate a particular station, it is necessary to prevent a subsequent roll call of the same line. Therefore, it will be shown below that the transmission of the address of the station being roll called causes a pulse to be inserted in delay line DL1 in the time position of the line being roll called.

Therefore, if no other line is available for roll call, the equipment will not attempt to roll call the same line until the interrogated station has replied, either that there is no message to transmit to the central office, which is indicated by placing a time position pulse on the ANS BACK(ILU) lead, which, as pointed out, stops the circulation of the time position pulse in delay line DL1; or that a signal is received on the EOM(ILU) lead indicating the end of the message which was transmitted in response to the roll call operation.

For the purpose of this description, it will be assumed that the roll call of one line has just been completed and, as will be seen, the completion of a roll call operation causes flip-flop FF1 to be set by the application of a pulse in the time position of the roll called line to the set side of flip-flop FF1. With flip-flop FF1 set, gate A3 is partially enabled. The next pulse from delay line DL2 will provide an additional enabling to gate A3 and, finally, if there is no pulse in delay line DL1, in the same time position as the pulse in delay line DL2, gate A3 will be fully enabled. Had delay line DL1 had a pulse in the same time position, it would be inverted through inverter INV4 and caused gate A3 to remain closed. In summary, a pulse will be passed through gate A3 in the time position of a line awaiting roll call so long as a pulse is not stored in delay line DL1 in the same time position.

The pulse passed through gate A3 is a start, or control, pulse which indicates that a roll call should be made of the line represented thereby. It will be seen later that the address store 5 has recorded therein a signal manifesting a preselected station on the line which is to be interrogated by the roll call operation.

The control pulse performs several functions. It resets flip-flop FF1, enables gates A5, stores a pulse in delay line DL3 in the same time position as the pulse which passed through gate A3 from delay line DL2, inhibits the recirculation of that pulse in delay line DL2 by closing gate A2, and sets flip-flop FF2.

The resetting of flip-flop FF1 inhibits gate A3, thereby preventing any other pulses from passing gate A3 until flip-flop FF1 is set at the end of this roll call operation.

The enabling of gates A5 allows signals to pass from time position generator counter 2 to line number counter 1. The time position generator counter is controlled by master clock pulses (not shown) in a manner to cause line number counter 1 to be set to a number corresponding to the numerical equivalent of the time position signal which enabled gates A5. The information may readily be passed from the time position generator counter 2 to the line number counter 1 in binary form and, therefore, the number of gates A5 required will depend upon the maximum number of lines and time positions. As previously mentioned, the counter in line number counter 1 is ring-connected and has exactly as many steps as the number of groups of lines having station addresses stored in address store 5.

The memory of the line being roll called is transferred from delay line DL2 to delay line DL3 by the passage of the time position control signal through gate OR4. This time position pulse is recirculated in delay line DL3 since gate A4 is normally partially enabled by inverter INV6.

The time position pulse that passed through gate A3 is inhibited from recirculating in delay line DL2 since the control pulse caused inverter INV3 to close gate A2 in that time position.

The setting of flip-flop FF2 by the control pulse partially enables gate A6 and reading means (not shown) start to detect signals from the address store 5. The first control signal that has any effect is the fiducial pulse that occurs once per cycle. The fiducial pulse is passed to lead 11 and through gate A6 to set flip-flop FF3 and reset flip-flop FF2. The resetting of flip-flop FF2 closes gate A6 so that subsequent fiducial pulses have no effect.

The setting of flip-flop FF3 enables gate A7, thereby allowing gate A7 to pass pulses which are transmitted from the address store, once per group, to lead 14. As previously mentioned under the discussion of the address store 5, a pulse is recorded in one track thereof at the start of each group of addresses. Therefore, with gate A7 enabled, each group pulse is passed through gate A7 to line number counter 1.

As previously mentioned, the line number counter 1 has been preset to a position indicative of the particular line to be roll called. That is, the counter is set a number of steps down from an arbitrary home position of the ring counter which is equal to the group number assigned the line to be roll called. Each group pulse which passes through gate A7 causes the ring counter in line number counter 1 to advance one step towards its home position. Thus, when the ring counter in the line number counter 1 is advanced to its home position, the address store will be in the proper position to provide the addresses of the various stations in that group. When line number counter 1 is advanced to its home position, an output pulse is produced which is applied to the terminals of flip-flop FF4 which is connected as a binary divider. The binary divider FF4 is alternately set and reset by the input signals. Therefore, the first time the line number counter 1 counts home, binary divided FF4 will be set and when line number counter 1 advances its counting ring clear around to its home position a second time, binary divider FF4 will be reset. The setting of FF4 will cause a change in the potential on the lower output lead of binary divider FF4 which will set flip-flop FF5. However, flip-flop FF7 and flip-flop FF3 are set and reset, respectively, in response to a change of potential in the opposite sense from that produced in the upper output lead. Thus, flip-flops FF7 and FF3 are not affected now but will set and reset, respectively, when binary divider FF4 is reset, thereby producing a change in potential of the upper output lead which is in the required sense.

The setting of flip-flop FF5 enables gate A8 but does not set flip-flop FF6 as the direction of change in the output potential of flip-flop FF5 is in the wrong sense to set flip-flop FF6.

The enabling of gate A8 allows the clock pulses recorded in the address store 5 to be transmitted to lead 12 and to pass through gate A8 to station number counter 3. Each clock pulse, including the one which occurred simultaneously with the group number pulse, will advance a counter in the station number counter 3 one step in a forward direction.

As previously mentioned, a preselected station on the line has been marked for interrogation during each roll call. The marking consists of recorded signal in the address store 5 in a cell which immediately precedes the address of the station to be interrogated. As will be seen, the preceding selecting recording is made in response to the detection of a clock pulse and is accomplished by means (not shown) which slightly delay the recording of the preceding marking signal so that when the preselecting marking signal is detected, it will be trailing a clock pulse. This may be accomplished by various means, such as the use of a delay line or making the recording in response to the trailing edge of the clock pulse rather than the leading edge. Thus, the preselecting marking signal never coincides with a clock pulse.

After the station number counter 3 has responded to the clock pulse immediately preceding the preselecting marking pulse, the marking pulse will be transmitted to read out lead 13RO to reset flip-flop FF5. The resetting of flip-flop FF5 will close gate A8, thereby preventing the station number counter 3 from counting any more clock pulses and, therefore, leaving a memory in the station number counter of the position where the preselecting marking signal was detected. In addition, the resetting of flip-flop FF5 will set flip-flop FF6 which, in turn, enables gate A9.

With gate A9 enabled, the next clock pulse will be allowed to pass through gate A9 and will reset flip-flop FF6, thereby closing gate A9.

The clock pulse which passed gate A9 may or may not coincide with a start of group pulse transmitted to lead 14 from the address store 5. If there is coincidence, the station after the marked station is actually a station in another group and is not the station to be interrogated at this time. When the coincidence occurs, it means that the first station in the group is to be interrogated and that the address store 5 must be advance through a nearly complete cycle. The present discussion will first describe the system operation when there is no coincidence and, later, the operation with coincidence will be described.

As has already been discussed, the station number counter 3 has been advanced to a setting which is one step less than the number of the station to be interrogated, the preselecting marking signal has been detected and has set flip-flop FF5, the next clock pulse has passed through gate A9, and flip-flop FF6 was reset. Since it is assumed that there is no start of group pulse coincident with the clock pulse, inverter INV5 provides an enabling potential to gate A10 and the pulse from gate A9 is, therefore, allowed to pass through gate A10. The pulse that passed through gate A10 is connected to recording lead 13REC to record a new preselecting marking signal in address store 5. It should be noted that there are now two successive preselecting marking signals recorded in the group being roll called and that, therefore, the original recording should be erased. In addition to making the preselecting marking recording, the pulse from A10 enabled gates A17, which allowed the address of the station to be interrogated to be transferred from the address store 5 to the route indicator store 4.

Subsequent signals from the address store 5 have no effect upon the equipment except for signals transmitted to lead 14, which advances line number counter 1. When the counting ring in line number counter 1 again reaches its home position, an output pulse is produced therefrom to reset flip-flop FF4. The resetting of binary divider FF4 resets flip-flop FF3 to close gate A7 and sets flip-flop FF7. The setting of flip-flop FF7 enables gates A12 and A14. With gate A14 enabled, clock pulses will pass therethrough to station number counter 3 to count the counting chain therein back towards its home position. Each successive clock pulse will count the station number counter down one step. When the station number counter lacks one step of being back to its starting point, it means that the first preselecting marking signal will very closely follow the next clock pulse. Thus, the station number counter 3 is arranged to produce an output pulse, when the counter is one step from its home position, to set flip-flop FF8. With flip-flop FF8 set, gate A13 is enabled. The next clock pulse will return the station number counter to its home position and will also pass through gate A13 to reset flip-flop FF7 and to transmit a signal to erase lead 13ER, which causes the first preselecting marking signal to be erased from the address store 5. In addition, the pulse which passed through gate A13 set flip-flop FF10 which, in turn, enabled gate A16.

It will be recalled that delay line DL3 has recorded therein a single circulating pulse in the time position of the line being roll called. The next time the circulating pulse appears at the output of delay line DL3 it will pass through gate A16 to enable gates A18 to pass the address of the station to be interrogated to the outgoing line units on a time division multiplex basis and in the time position of the line being roll called.

In addition, the pulse passed through gate A16 passes through inverter INV6 to inhibit the recirculation of the time position memory in delay line DL3, passes a pulse through gate OR1 to record in the appropriate time position in delay line DL1 that that particular line is not to be roll called again until either an end of message or an answer back signal is received from the incoming line units in the right time position, and sets flip-flop FF1 to admit another control pulse from delay line DL2 to initiate the roll calling of another line.

The above-described roll call apparatus will roll call the lines sequentially, skipping any lines which for one reason or another should not be roll called and interrogates one station on each line. When the roll call equipment roll calls a previously roll called line, it will interrogate the station succeeding the previously interrogated station. If the last station in a group was the last station to be interrogated, then the succeeding roll call of that group will interrogate the first station in that group. If desired, a given station in a group may be interrogated more frequently than other stations simply by recording its address two or more times in the address store 5.

As was pointed out, the foregoing discussion assumed that a clock and start of group pulse did not occur simultaneously after gate A9 was enabled. If the two pulses do occur simultaneously, the start of group pulse will be transmitted to lead 14 and will cause gate A10 to be inhibited because of the presence of inverter INV5 and gate A11 will be opened to pass a pulse to set flip-flop FF9 which, in turn, enables gate A15. As before, the line number counter 1 will count around its ring to its home position and thereby reset binary divider FF4. The resetting of FF4 sets the flip-flop FF7, as before, but, in addition, the change in potential at the output of binary divider FF4 passes a pulse through gate A15 to enable gates A17, thereby permitting the address of the proper station to be transferred from the address store 5 to the route indicator store 4. In addition, the pulse that passed through gate A15 is transmitted to recording lead 13REC to record a new preselecting marking signal in the address store 5 to indicate the next station to be interrogated when this line is roll called again. In the same manner as that described above, the station number counter 3 counts down and erases the now unwanted preselecting marking signal and resets the system for a roll call of the next line available for roll calling.

While the foregoing has shown and described what is considered at present to be the preferred embodiment of the invention, modifications thereto will readily occur to those skilled in the art. For example, it might be desired to introduce a signal into delay line DL1 to inhibit the roll calling of a line which does not have at least one transmitter desiring to transmit a message, and it is obvious that the address store may take various forms with corresponding changes required in the associated equipment. It is not desired, therefore, that the invention be limited to the embodiment shown and described, and it is intended to cover in the appended claims all such modifications as fall within the true spirit and scope of the invention.

What is claimed is:

1. A roll call generator serving a plurality of different lines each of which has a predetermined number of stations associated therewith to be roll called, each separate station of any one line being identified by a different address; said generator comprising a storage device including a plurality of groups of consecutive slots, each of said lines having at least one of said groups corresponding thereto and each of said groups including at least as many consecutive slots therein as the predetermined number of stations associated with the particular line with which that group corresponds, information comprising the address of each station of each particular line being stored in a separate slot of solely each of said groups corresponding with that particular line, each of said slots having control information stored therein, and readout means for cyclically scanning each of said slots in sequence for reading out the information stored in each slot in response to that slot being scanned, said control information upon being read out providing first control signals from which the relative ordinal position of a slot being scanned within a group and the relative ordinal position of the group including the slot being scanned within a cycle may be derived, and fruther providing a special control signal from a single slot of each group when that single slot is being scanned; first means producing second control signals manifesting the relative ordinal position within a cycle of a given group which corresponds to the line then to be roll called; second means coupled to said first means and said readout means and responsive to said first and second control signals for producing only during a first of two successive scan cycles an output in response solely to that special control signal produced during the scan of said single slot within said given group; a bistable switch coupled to said second means and said readout means which is set by an output from said second means and reset in response to the scan of that slot which next follows said single slot of said given group; third means including normally closed address forwarding means coupled to said readout means, fourth means and fifth means, said fourth means coupled to said bistable switch and to said storage device and responsive to said first control signals and to said bistable switch having been set and said next-following slot being other than the first slot of a group for opening said forwarding means to permit forwarding of the address of the station stored in said next-following slot and for altering the control information stored in said next-following slot to provide a special control signal therefrom during subsequent scan cycles, said fifth means coupled to said bistable means and to said storage device and responsive to said first control signals and to said bistable switch having been set and said next-following slot being the first slot of a group for opening said forwarding means to permit forwarding the address of the station stored in the first slot of said given group during the second of said two successive scan cycles and for altering the control information stored in said first slot of said given group to provide a special control signal therefrom during subsequent scan cycles; and sixth means coupled to said second means and said storage device for applying only during the second of said two successive scan cycles an erase signal to said single slot of said given group to alter the control information stored therein to eliminate the providing of a special control signal therefrom during subsequent scan cycles.

2. The roll call generator defined in claim 1, wherein said first means comprises a time position generator counter for generating a repetitive time frame composed of a plurality of successive time positions, each group having a different time position corresponding therewith, whereby each time position corresponds with an individual one of said lines, the output of said time position generator counter manifesting the then occurring time position in accordance with its ordinal position within a time frame, normally closed gate means effective when open for applying the output of said time position generator counter to said second means as said second control signals, and control means for selectively momentarily opening said gate means during a time position corresponding with a line to be roll called.

3. The roll call generator defined in claim 2, further including a static address store for storing said forwarded address in response to the opening of said forwarding means; and wherein said control means comprises first, second and third recirculating delay line loops each of which has a loop time delay equal to the duration of a single time frame, first entry means for entering a signal for storage into said first delay line loop only in each time positon corresponding to a line which is not to be roll called, second entry means for entering a signal for storage into said second delay line loop only in each time position corresponding to a line which is to be roll called and simultaneously therewith opening said first delay line loop, said third delay line loop having a signal stored therein solely in that single time position which corresponds to said given group, a second bistable switch, means coupled to said sixth means and said third delay line loop and responsive to the first occurrence of said single time position which is subsequent to the occurrence of said erase signal for sampling said static address store, opening said third delay line loop, setting said second bistable switch and applying a signal to said first entry means all during the occurrence of that single time position, means responsive to the occurrence of the first time position subsequent to the setting of said second bistable switch wherein there is a signal stored in said second delay line loop and the absence of a signal stored in said first delay line loop for resetting said second bistable switch, opening said gate means, opening said second delay line loop and entering a signal in said third delay line loop all during the occurrence of that first time position, whereby the line corresponding to that first time position becomes the next line to be roll called.

References Cited by the Examiner

UNITED STATES PATENTS

| | | | |
|---|---|---|---|
| 2,444,078 | 6/1948 | Weaver | 340—163 |
| 2,583,088 | 1/1952 | Clutts et al. | 340—163 |
| 2,629,088 | 2/1953 | Kendall | 340—163 |
| 2,794,179 | 5/1957 | Sibley | 340—163 |
| 2,882,341 | 4/1959 | Trousdale | 179—18.9 |
| 2,917,583 | 12/1959 | Burton et al. | 179—18.9 |
| 3,046,525 | 7/1962 | Deming et al. | 340—163 |

NEIL C. READ, *Primary Examiner.*

ROBERT H. ROSE, *Examiner.*